(12) United States Patent
Ahsanuzzaman et al.

(10) Patent No.: US 8,937,818 B2
(45) Date of Patent: Jan. 20, 2015

(54) LOW-VOLUME PROGRAMMABLE-OUTPUT PFC RECTIFIER WITH DYNAMIC EFFICIENCY AND TRANSIENT RESPONSE OPTIMIZATION

(71) Applicants: Sheikh Mohammad Ahsanuzzaman, Toronto (CA); Aleksandar Prodic, Toronto (CA)

(72) Inventors: Sheikh Mohammad Ahsanuzzaman, Toronto (CA); Aleksandar Prodic, Toronto (CA)

( * ) Notice: Subject to any disclaimer, the term of this patent is extended or adjusted under 35 U.S.C. 154(b) by 194 days.

(21) Appl. No.: 13/758,848

(22) Filed: Feb. 4, 2013

(65) Prior Publication Data
US 2013/0201729 A1    Aug. 8, 2013

Related U.S. Application Data

(60) Provisional application No. 61/594,413, filed on Feb. 3, 2012.

(51) Int. Cl.
*H02M 3/335* (2006.01)
*H02M 1/42* (2007.01)

(52) U.S. Cl.
CPC ........ *H02M 3/33507* (2013.01); *H02M 1/4208* (2013.01); *H02M 3/33576* (2013.01); *Y02B 70/126* (2013.01)
USPC ................................ 363/17; 363/65; 323/222

(58) Field of Classification Search
USPC ......... 363/16–20, 21.01, 21.07, 21.08, 21.12, 363/56.01, 65, 126, 127, 89; 323/207, 222, 323/254, 262, 285; 315/291, 307
See application file for complete search history.

(56) References Cited

U.S. PATENT DOCUMENTS

| | | | |
|---|---|---|---|
| 6,504,497 B2 * | 1/2003 | Jang et al. | 341/125 |
| 7,187,136 B2 * | 3/2007 | Fiorello | 315/224 |
| 7,719,246 B2 * | 5/2010 | Melanson | 323/282 |
| 7,746,041 B2 * | 6/2010 | Xu et al. | 323/223 |
| 7,872,886 B2 * | 1/2011 | Xu et al. | 363/65 |

* cited by examiner

*Primary Examiner* — Rajnikant Patel
(74) *Attorney, Agent, or Firm* — Miller Thomson LLP; Eugene Gierczak; Eduardo Krupnik (57) ABSTRACT

The present invention is a system, apparatus and method of a PFC rectifier having a programmable output voltage that does not incur a drastic penalty in the overall size or volume of the device, or a significant degradation in efficiency. The PFC rectifier of the present invention may incorporate a two-stage solution for output voltage regulation. The present invention provides a topology of a small-size/volume PFC rectifier with a variable (i.e. programmable) output voltage and a complementary control method. The two-stage system of the present invention incorporates a smaller and lower cost capacitor than the bulky size and costly energy storage capacitors required in conventional prior art. The present invention also achieves tight output regulation. The two-stage topology of the present invention further achieves on-line efficiency optimization and significantly reduces the volume of the downstream stage over the prior art examples through dynamic adjustment of the downstream stage supply voltage.

19 Claims, 8 Drawing Sheets

LOW-VOLUME PROGRAMMABLE-OUTPUT PFC RECTIFIER WITH DYNAMIC EFFICIENCY AND TRANSIENT RESPONSE OPTIMIZATION

This application claims the benefit of U.S. Provisional patent application Ser. No. 61/594,413 filed Feb. 3, 2012.

FIELD OF INVENTION

This invention relates in general to the field of power factor correction (PFC) rectifiers and more particularly to PFC rectifiers having a programmable output voltage.

BACKGROUND OF THE INVENTION

Single-phase rectifiers, for example, such as ac-to-dc converters, with power factor correction or PFC providing power up to approximately 100 W are widely used as chargers for mobile devices or dedicated supplies. Common applications for such PFC rectifiers include, for example, personal computers, consumer electronics, telecommunication devices, and avionics equipment.

Increasingly, in addition to requiring a close to unity power factor (PF) and low total harmonic distortion (THD), emerging standards and applications are calling for PFC rectifiers with a programmable output voltage. For example, the IEEE Universal Power Adapter for Mobile Devices (UPAMD) standard, which defines a connection between a charger (adapter) and supplied mobile device, defines a communication link that sets up required output voltage level as well as voltage transition times. As another example, in an adaptive voltage bus system, a programmable dc bus voltage may be changed quickly based on the bad requirements.

Conventional PFC rectifier designs providing constant output voltage are not well suited for the emerging applications for programmable outputs. This is mostly due to a requirement for a large increase in the size/volume of the reactive components and or significant degradation in power processing efficiency of such emerging applications.

For conventional, constant output applications, a number of prior single-phase ac-dc solutions with power factor correction, have been proposed. Generally, these proposals can be divided into single and two-stage systems. In a typical low power application, where cost is a dominant factor, single stage solutions employing a flyback converter are frequently used. This is mostly due to the controller and system simplicity, and may also be due to the existence of galvanic isolation. However, these systems usually suffer from voltage regulation problems and require a bulky output capacitor to compensate for frequency line harmonics in the output voltage. Using as conventional design, the requirement for a variable and tight regulated output voltage necessitates a storage capacitor that is much larger, and therefore necessarily increases the requirement for its size. For example, to reduce the voltage from commonly used 20V down to 5V maintaining the same output voltage regulation (i.e. the ratio between the ripple and the desired output voltage value), a 16× larger capacitor is required. Such a capacitor would be by far the largest and most expensive component of the system, drastically increasing the overall volume and price of the PFC rectifier.

More complex two-stage solutions have better voltage regulation. In a two-stage solution, the first stage provides ac-dc rectification, and the second stage provides a dc-dc step-down which keeps the output voltage well regulated. In such two-stage systems, the intermediate voltage between the two stages is usually selected based on output voltage and there are design tradeoffs between the converter efficiency and dynamic response. In general, by reducing the difference between the input and output voltages, the efficiency of the downstream stage can be improved.

However, this improvement generally comes at the expense of a large increase in the energy storage capacitor (i.e. the intermediate capacitor value). This increase in the intermediate capacitor value comes from a hold-up time requirement, where the intermediate capacitor is required to provide energy for the supplied load during short input line voltage interruption periods. Since the value of the energy stored in a capacitor is proportional to the square of its voltage, each reduction of the capacitor voltage again requires an exponential increase in the capacitance value to maintain the same amount of energy (i.e. the same hold up time). As well, the reduced voltage degrades the dynamic response and, consequently, necessitates a larger capacitance value in the downstream converter. Both of these are serious concerns as they effect performance and cost.

These various limitations in prior PFC rectifier designs pose significant challenges. What is therefore needed is an improved PFC rectifier design which overcomes at least some of these limitations.

There area number of publications that discuss the prior art PFC rectifier designs, including the following:

[1] Universal Power Adapter for Mobile Devices, "IEEE UPAMD." Internet: http://grouper.ieee.org/groups/msc/upamd, Jun. 19, 2010 [Jul. 18, 2011].

[2] K. Lee, F. C. Lee, J. Wei, and M. Xu, "Analysis and design of adaptive bus voltage positioning system for two-stage voltage regulators," *IEEE Transactions on Power Electronics*, vol. 24, no. 12, pp. 2735-2745, August 2009.

[3] W. F. Ray, and R. M. Davis. "The definition and importance of power factor for power electronic converters," in Proc. *European conference on Power Electronics and Application's, EPE*-1989, pp. 799-805, 1989.

[4] L. Huber, J. Zhang, M. M. Jovanovic, and F. C. Lee, "Generalized topologies of "Single-stage input-current-shaping circuits," *IEEE Trans., Power Electron.*, vol. 16, pp. 508-513, July 2001.

[5] R. Redl, L. Balogh, and N. O. Sokal. "A new family of single-stage isolated power-factor correctors with fast regulation of the output voltage," in *IEEE Power Electronics Specialists Conf., PESC*-1994, pp. 1137-1144.

[6] R. Erickson, M. Madigan, and S. Singer. "Design of a simple high power factor rectifier based on the flyback converter," in Proc. *IEEE Applied Power Electronics Conf., APEC*-1990, pp. 792-801.

[7] G. Choe, and M. Park, "Analysis and control of active power filter with optimized injection," in Proc. *IEEE Power Electronics Specialists Conference, PESC*-1986, pp. 401-409.

[8] N. P. Papanikolaou, E. J. Rikos, and E. C. Tatakis, "Novel technique for high power factor correction in flyback converters," in Proc. *IEEE Electric Power Applications*, vol. 148, no. 2, pp. 177-186, March 2001.

[9] W. Tang, V. Jiang G. C. Hue, F. C. Lee, and I. Cohen, "Power factor correction with flyback converter employing charge control," in Proc. *IEEE Applied Power Electronics Conference*, APEC-1993, pp. 293-298.

[10] H. Wei, I. Batarseh. "Comparision of basic converter topologies for power factor correction," in Proc. *Southeastcon*-1998, pp. 348-353.

[11] R. Oruganti, and M. Palanipan, "Inductor voltage control of back-type single-phase AC-DC converter," *IEEE Trans on Power Electronics*, vol. 15, No, 2, pp. 411-417, March 2000.

[12] J. Zhang, M. M. Jovanovic, and F. C. Lee. "Comparison between CCM single-stage and two-stage boost converter," in Proc. *IEEE Applied Power Electronics Conference, APEC*-1999, pp. 335-341.

[13] A. K. Jha, K. H. Babu, and B. M. Karan, "Parallel power flow AC/DC converter with high input power factor and tight output voltage regulation for universal voltage application," in Proc. *Power Electronics, Drives and Energy Systems, PEDES*-2006, pp. 1-7.

[14] A. Pothana, and K. Vasudevan, "Parallel operation of power factor corrected AC-DC converter modules with two power stages," in Proc. *Conference on Power Electronics and Drive Systems*, PEDs-2007, pp. 953-960.

[15] G. Spiazzi, S. Buso, and D. Tagliavia, "A low-loss high-power-factor flyback rectifier suitable for smart powerintegration," in Proc. *IEEE Power Electronics Specialists Conference, PESC*-2000, vol. 2, pp. 805-810, 2000.

[16] J. A. A. Qahoug, G. Muralidhar. "Control scheme for high-efficiency high-performance two-stage power converters," in Proc. *Applied Power Electronics Conference end Exposition, APEC*-2009, pp. 1226-1232.

[17] A. Radic, Z. Lukic, A. Prodic, and R. de Nie, "Minimum deviation digital controller IC for single and two phase dc-dc switch-mode power supplies," in proc. *IEEE Applied power Electronics Conference and Exposition (APEC)*, pp. 1-6, 2010.

[18] S. M. Ahsenuzzaman, A. Radič, and A. Prodić, "Adaptive switching frequency scaling digital controller for improving efficiency of battery powered dc-dc converters," *IEEE Applied Power Electronics Conference, APEC*-2011, pp. 910-915, 2011.

[19] R. W. Erickson and D. Maksimovič, "Fundamentals of Power Electronics", Second Edition, New York: Springer Science+Business Media, 2001.

[20] Lukic, Z. Zhao, S. M. Ansanuzzaman, and A. Prodic, "Self-tuning digital current estimator for low-power switching converters," in *IEEE Applied Power Electronics Conference (APEC*-2008), pp. 529-534, March 2008.

[21] T.-L. Chern, L-H. Liu, C.-N. Huang, Y-L. Chern, and J. H. Kuang. "High power factor flyback converter for LED driver with boundary conduction mode control," in Proc. *IEEE Conference on Industrial Electronics and Applications*, pp. 2088-2093, 2010,

[22] D. Maksimovič, and R. Erickson, "Modeling of cross-regulation in multiple-output flyback converters," in *IEEE Applied Power Electronics Confererence (APEC*-1999), pp. 1068-1072, March 1999.

[23] Johns and K. Marlin, *Analog Integrated Circuit Design*, John Wiley & Sons, 1997.

[24] "AN10868, GreenChip TEA1733 series fixed frequency flyback controller," Datasheet, NXP Semiconductor, 2010, available http://www.nxp.com.

SUMMARY OF THE INVENTION

In one aspect, the present disclosure relates to a PFC rectifier with a programmable output voltage operable to reduce the size or volume of a converter in a downstream stage of the PFC rectifier, comprising: a flyback converter operable in discontinuous conduction mode incorporated in a front stage, and said flyback converter incorporating a non symmetric capacitive divider incorporating a top capacitor and a bottom capacitor, wherein: the top capacitor is operable to store energy at a sufficiently high voltage to provide hold up time and increase a current slew rate during transients to provide a fast dynamic transient response; and the bottom capacitor is operable to dynamically adjust on-line power processing and regulate the efficiency of a downstream stage of the PFC rectifier; and a buck converter incorporated in the downstream stage.

In another aspect, the present disclosure relates to a method for controlling a programmable output voltage in a PFC rectifier that incorporates a converter in a downstream stage having a reduced size and volume, comprising the steps of: providing a non symmetric capacitive divider in a front stage of the PFC rectifier, the divider having a top capacitor and a bottom capacitor; operating the top capacitor to store energy at a sufficiently high voltage to provide hold up time and increase a current slew rate during transients to provide a fast dynamic transient response; operating the bottom capacitor to dynamically adjust on-line power processing and regulate the efficiency of a downstream stage of the PFC rectifier; operating the converter in the downstream stage; and operating a controller to control the front stage and the downstream stage.

In another aspect, the present disclosure relates to a PFC rectifier system with a programmable output voltage operable to reduce the size or volume of a converter in a downstream stage of the PFC rectifier, comprising: a flyback-buck two stage converter operable to achieve a combination of a front stage and a downstream stage; an integrated controller operable to regulate the operation of the front stage and the downstream stage; a non symmetric capacitive divider in the front stage, the divider having a top capacitor and a bottom capacitor, wherein: the top capacitor is operable to store energy at a sufficiently high voltage to provide hold up time and increase a current slew rate during transients to provide a fast dynamic transient response; and the bottom capacitor is operable to dynamically adjust on-line power processing and regulate the efficiency of a downstream stage of the PFC rectifier.

In another aspect, the present disclosure relates to a PFC rectifier with a programmable output voltage and having improved dynamic efficiency and transient response.

In another aspect, the present disclosure relates to a PFC rectifier with a programmable output voltage operable to reduce the size or volume of a converter in the downstream stage of the PFC rectifier, comprising: a non symmetric capacitive divider in a front stage of the PFC rectifier, the divider having a top capacitor and a bottom capacitor, wherein: the top capacitor is operable to store energy at a sufficiently high voltage to provide hold up time and increase a current slew rate during transients to provide a fast dynamic transient response; and the bottom capacitor is operable to dynamically adjust on-line power processing and regulate the efficiency of a downstream stage of the PFC rectifier.

In another aspect, the present disclosure relates to a method for controlling a programmable output voltage in a PFC rectifier that incorporates a converter in the downstream stage having a reduced size and volume, comprising: providing a non symmetric capacitive divider in a front stage of the PFC rectifier, the divider having a top capacitor and a bottom capacitor; operating the top capacitor to store energy at a sufficiently high voltage to provide hold up time and increase a current slew rate during transients to provide a fast dynamic transient response; and operating the bottom capacitor to dynamically adjust on-line power processing and regulate the efficiency of a downstream stage of the PFC rectifier.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carded out in various ways. Also it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a system, apparatus and method of a power factor correction (PFC) rectifier design with a programmable output voltage that does not incur a drastic penalty in the overall size or volume of the device, nor a significant degradation in efficiency. The PFC rectifier of the present invention is well-suited for two-stage solutions for output voltage regulation in various applications. The present system and apparatus provides a topology of a small-size/volume PFC rectifier with, a variable (i.e. programmable) output voltage and a complementary control method. The two-stage system of the present invention incorporates a smaller and lower cost capacitor than the bulky size and costly energy storage capacitors required in conventional prior art. The present invention further achieves tight output regulation. The two-stage topology of the present invention further achieves online efficiency optimization and significantly reduces the volume of the downstream stage over the prior art examples through dynamic adjustment of the downstream stage supply voltage.

The present invention provides a system, method and apparatus for minimizing the size/volume and improving efficiency of power factor correction (PFC) rectifiers over the prior art. This is just one of several benefits that the present invention offers over the prior art.

In one embodiment of the present invention a modified flyback-buck cascaded configuration is incorporated whereby an intermediate energy storage capacitor in the front stage is replaced by a non-symmetric capacitive divider with independently controllable tap voltages. The voltages are dynamically controllable such that the size/volume of the intermediate capacitor can be significantly reduced over the requirements of the prior art. Furthermore, the size of any downstream stage converter is reduced in comparison to the prior art and overall system efficiency optimized without sacrificing dynamic response.

Embodiments of the system, apparatus and method of the present invention provide a topology of a small-size/volume PFC rectifier with a variable (i.e. programmable) output voltage and a complementary control method. The present two-stage system drastically reduces the size of bulky and costly energy storage capacitors required in conventional prior art solutions while providing tight output regulation. Furthermore, the two-stage topology features on-line efficiency optimization and significantly reduces the volume of the downstream stage through dynamic adjustment of the downstream stage supply voltage.

To minimize the system volume, the bulky energy storage capacitor of prior designs is replaced in embodiments of the present invention with a non-symmetric capacitive divider with practically independent control of two tap voltages. The centre tap (i.e. bus voltage) is adaptively regulated such that the efficiency of the downstream stage is optimized. The top capacitor of the divider, having a larger voltage and such smaller capacitance value than that of the bottom one, is used to provide hold up time and increase current slew rate during transients canceling negative effects of the efficiency optimization.

Charging either bottom capacitor, or both of them, performs a practically independent regulation of the divider voltages. In the case of the modified flyback design, this is performed with a single secondary winding, eliminating the need for a custom flyback inductor design, as well as cross-regulation problem existing in two winding solutions. The regulation is based on the current steering and utilization of a large difference in the divider capacitance values. Experimental results confirm the above described system advantages and proper operation.

Thus, in one embodiment of the present invention, there is provided a two-stage power mall volume two-stage PFC rectifier with a programmable output voltage, where the bulky energy storage capacitor is replaced with a non symmetric capacitive divider. The bottom capacitor of the divider is used to provide relatively low voltage to do downstream stage minimizing losses and the volume of the downstream converter. The top cell of the divider having large voltage is used to store energy for hold-up time and provide fast dynamic response during transient.

In one embodiment of the present invention, a non-symmetric capacitive divider is used consisting of a larger bottom cap and smaller top cap, where the top cap has a higher voltage.

In another embodiment of the present invention, a centre tap voltage (i.e. the bottom capacitor voltage) is adaptively changed depending on conditions in the circuit to perform on-line power processing efficiency optimization.

In another embodiment of the present invention, the system is based on a flyback-buck two-stage combination for a front stage and a downstream converter, and an integrated controller regulates operation of both stages.

In another embodiment of the present invention, there is provided a method for improving transient response of the downstream stage (i.e. for reducing the output capacitor value by increasing the voltage applied at its input).

In another embodiment of the present invention, there is provided a method for minimizing inductance of the downstream stage by regulating its input voltage (i.e. centre tap voltage such that it is always in the vicinity of the output voltage).

In another embodiment of the present invention, there is provided for reducing switching losses of the converter by reducing switching voltage of the downstream converter.

In another embodiment of the present invention, independent regulation of both tap voltages performed by charging only bottom capacitor (resulting in the bottom capacitor voltage increase) or both capacitors in series, resulting mostly in the increase of the top capacitor voltage, consequently providing independent regulation of both voltages.

A skilled reader will recognize that a variety of embodiments of the present invention are possible, and that these embodiments of the present invention may be configured in a variety of manners. Therefore, the description herein, and the drawings, are provided as examples of possible embodiments of the present invention.

Figure 1:
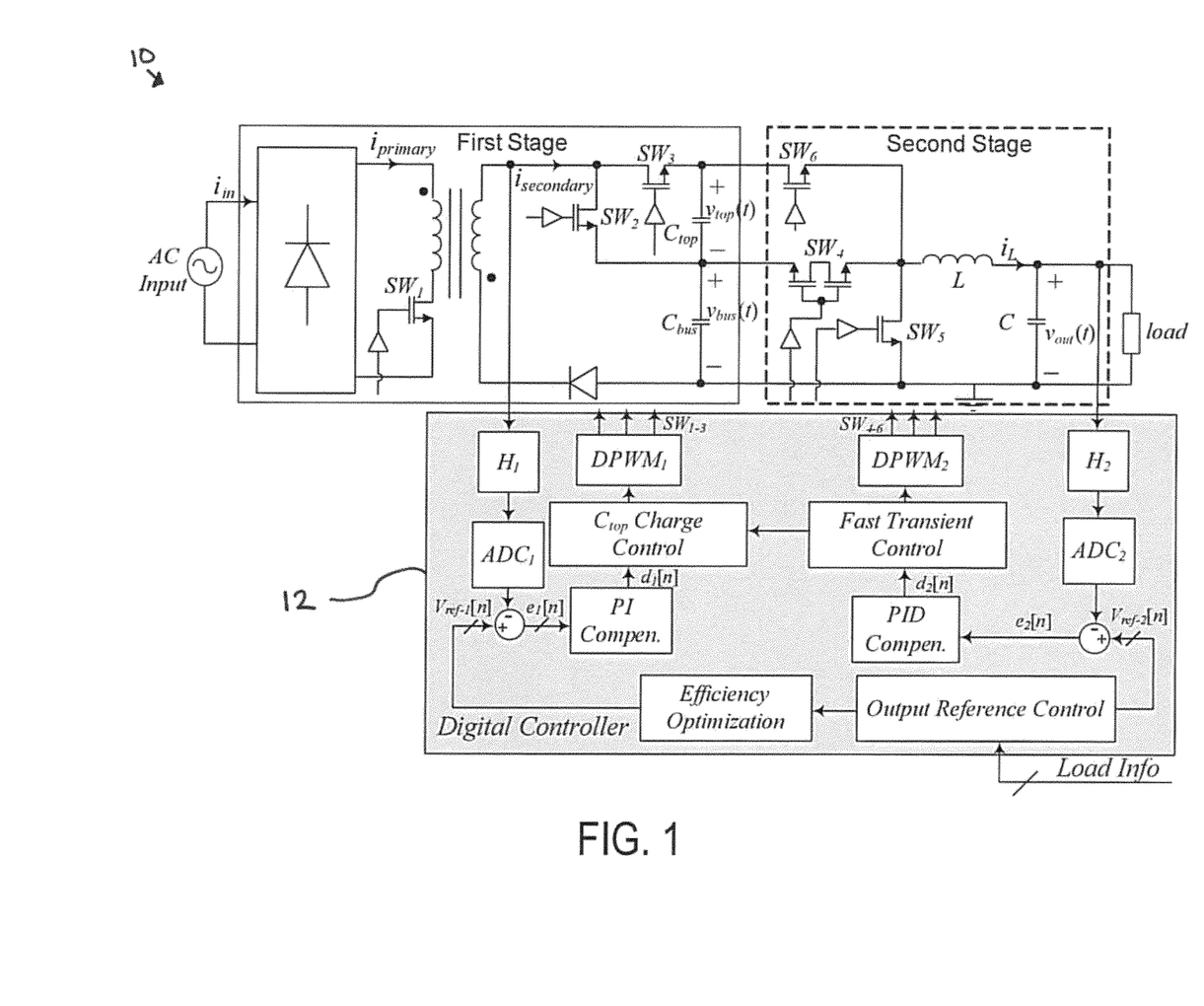
FIG. 1 illustrates a programmable-output PFC rectifier and complementary digital controller in accordance with en embodiment of the present invention.

In one embodiment of the present invention, as shown in FIG. 1, a programmable-output PFC rectifier 10 incorporates, or is otherwise linked to, a complementary digital controller 12. Such an embodiment of the present invention may be a simple flyback-based two-stage solution; as is shown in FIG. 1.

In this embodiment, a flyback converter operating in discontinuous conduction mode may be used as the front stage and a buck converter may be used as a downstream converter. In this case, the output capacitor of the flyback may be replaced with a non-symmetric capacitive divider. Even though the presented solution provides programmability of the output voltage, the total volume of the divider is similar or even smaller than that, of a capacitor that would be needed for a constant output voltage solution.

The converter operates with relatively small flyback capacitors, for which the total size/volume and price are comparable, or even lower than that of the conventional constant output voltage solutions. As will now be explained, the system also has tight regulation of the output voltage, and provides a fast transient response while operating at, or near, an optimized efficiency point.

Principles of Operation

The principles of operation of the present invention, such as the embodiment shown in FIG. 1, will now be explained in more detail. As noted, the system of the present invention, an embodiment of which is shown in FIG. 1, may incorporate a two-stage converter were the first (i.e. the front) stage is a modified flyback, and the second stage is a conventional buck with an extra switch, $SW_6$. In one embodiment of the present invention, the front stage (i.e. the flyback), is modified such that the output capacitor is replaced with a non-symmetric capacitive divider of a smaller equivalent capacitance, were the voltages of the two capacitors are independently regulated.

A divider centre tap voltage $v_{bus}(t)$, i.e. the bus voltage, is the input of the downstream converter (the buck in this embodiment) during regular, steady-state operation. This divider centre tap voltage is allowed to have relatively large tipple at twice the line frequency, to minimize the capacitor ($C_{bus}$) value. As described in more detail below, the dc value of the bus voltage may be dynamically adjusted based on the desired output voltage level, such that the efficiency is maximized and, at the same time, the inductor value of the downstream stage is reduced.

The top capacitor—whose value is relatively small and the voltage is kept at a relatively high but still safe level—has two roles: (i) first, the top capacitor is used to provide a required hold up time; and (ii) second, the top capacitor improves the dynamic response of the downstream stage resulting in the minimization of the output capacitance value. As described in more detail below, during load transients, the top capacitor voltage is applied at the input of the downstream stage to improve the output capacitor charging rate, therefore minimizing its energy storage requirements.

In one embodiment of the present invention, as shown in FIG. 1, both stages are regulated with a digital controller that has two interactive control loops. The front-end controller regulates operation of the flyback converter such that close to a unity factor is achieved and, at the same time, regulates the average values of divider tap voltages based on information from an efficiency optimization block. The controller of the buck provides fight output voltage regulation and fast dynamic response. During transients, the buck controller employs a minimum deviation control algorithm, recovering the current in a single on-off switching cycle war the minimum possible output voltage deviation.

Utilizing Programmable Intermediate Bus Voltage for Efficiency Optimization

The efficiency of two-stage converters with a wide range of operating conditions can be optimized by changing the voltage difference between the intermediate bus voltage and the output voltage. This allows optimization of the converter conduction and switching losses depending on the output power level of the converter. For optimum efficiency, this results in much lower than maximum intermediate bus voltage due to significant reduction of switching losses. This reduction of voltage difference reduces component stress on the second stage dc-dc converter and results in a lower inductor ripple, thus allowing possible reduction of the inductor size. Hence, to optimize the efficiency and at the same time to minimize the value of the buck inductor while maintaining a constant ripple, the intermediate bus voltage may be dynamically changed based on the operating condition.

Improving Dynamic Performance of the Downstream Stage

In one embodiment of the present invention, the reduction of the input voltage described above improves efficiency of the downstream buck stage but, in order to avoid any degrading of dynamic performance, the output capacitor size may be increased. A larger output capacitor is required even though the buck inductor is reduced. This is due to even a larger drop in the inductor current slew rate during light-to-heavy load transients, resulting in slower charging of the output capacitor.

Figure 2:
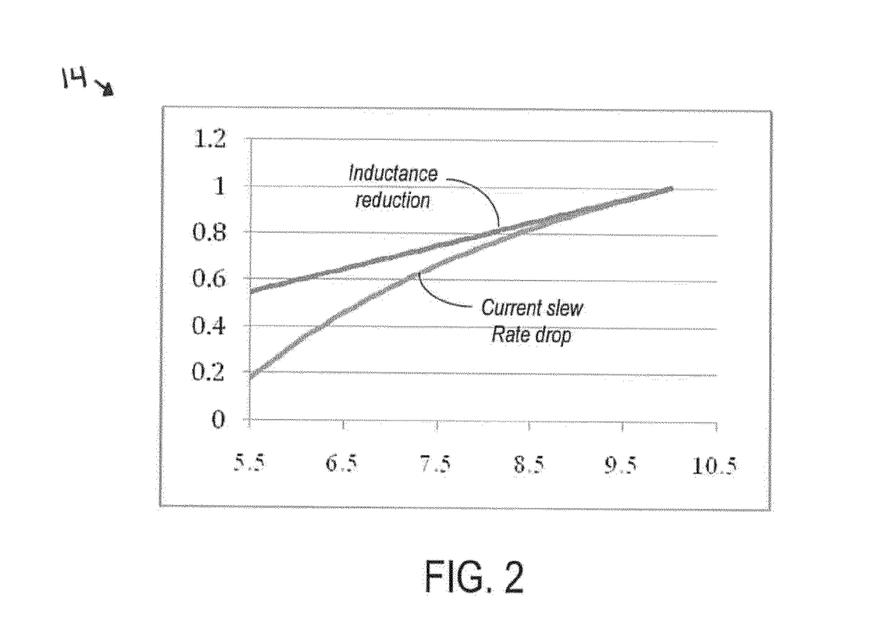
FIG. 2 shows a graphical representation of a reduction in inductor size vs. inductor current slew rate for a 5V buck converter which bus voltage changes between 5.5 V and 10 V.

An example of the possible results of such an embodiment of the present invention is shown in FIG. 2 as a graphical representation 14. The graph shows a maximum possible reduction in the inductance and, for the reduced inductance, a drop in the inductor current slew rate for a 10 V to 5 V rated buck converter, as its supply voltage changes between the output and maximum value. The results shown in FIG. 2 are obtained from simple equations for the inductor current ripple and current slew rate during a light-to-heavy load transient.

In order to improve transient response, a second capacitor, $C_{top}$, may be incorporated in an embodiment of the present invention, as shown in FIG. 1. This second capacitor is charged at a higher voltage than the bus voltage, and used during light-to-heavy load transients to improve the inductor current slew rate. As described in further detail below, the average voltage value of this capacitor is regulated independently of the bus voltage, with the modified flyback converter. It should be noted that the size/volume of this capacitor can be much smaller than that of $C_{bus}$ (as shown in FIG. 1) allowing for cost-effective implementation. The low value of $C_{top}$ is possible, since it only provides energy during transients, and is not used to supply the difference between the time varying input and constant output power.

Figure 3:
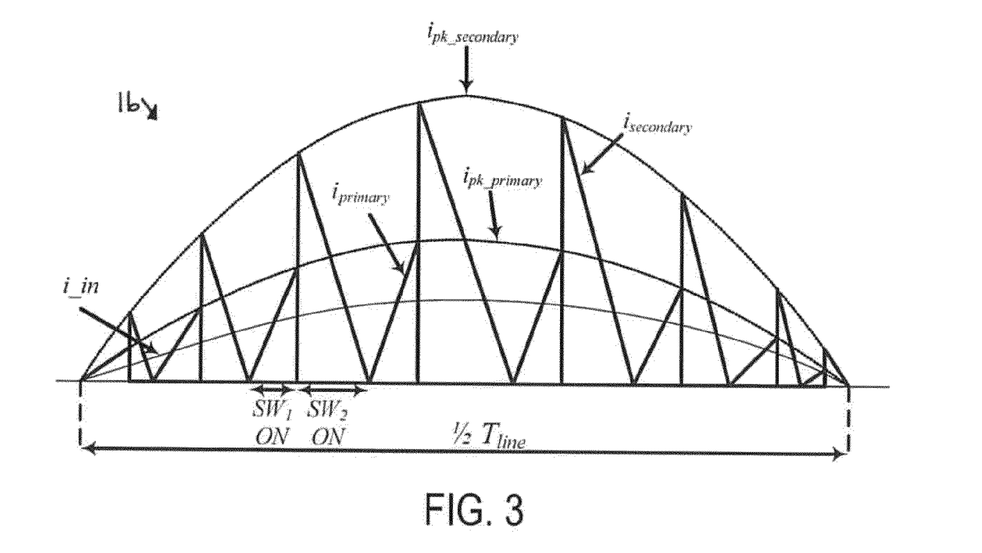
FIG. 3 illustrates a flyback converter boundary conduction mode (BCM) current waveforms relating to an embodiment of the present invention.

For one embodiment of the present invention, the following calculation shows how the size of $C_{top}$ may be selected to improve the transient response of the second stage. The integration and results of aspects of this calculation, based on an embodiment of the present invention, are further shown in FIG. 3. Charge transferred from $C_{top}$ to output capacitor, C during a $\Delta i$ step transient can be calculated as:

$$\Delta Q = \frac{1}{2} * T_c * \Delta i \quad (1)$$

Where $T_c$ is the time to reach the new steady stage current value:

$$T_c = \frac{\Delta i}{\frac{Vtop + Vbus - Vout}{L}} \quad (2)$$

where $V_{top}$ and $V_{bus}$ are the top capacitor and bus capacitor voltages, respectively and $V_{out}$ is the output voltage. L is the value of the inductor. Substituting (2) in (1):

$$\Delta Q = \frac{1}{2} \frac{L \cdot \Delta i^2}{(Vtap + Vbus - Vout)} \quad (3)$$

Now since the top capacitor, $C_{top}$ is much smaller than $C_{bus}$, one can assume that the entire voltage drop due to this charge transfer $\Delta V$, occurs across the top capacitor. Hence, the top capacitor value can be calculated as:

$$C_{tap} = \frac{1}{2} \cdot \frac{L \cdot \Delta i^2}{(Vtap + Vbus - Vout) \cdot \Delta V} \quad (4)$$

The large difference in the capacitor values is used to implement practically independent control of the output voltages, as described below.

Illustrative Embodiment

In one embodiment of the system of the present invention, the intermediate storage capacitor is replaced with a non-symmetric capacitive divider, as shown in FIG. 1, on a flyback followed by a buck converter example. In such an embodiment of the present invention the controller incorporates a proportional-integral (PI) compensator to regulate the intermediate bus voltage $v_{bus}(t)$ and a dual-mode compensator to regulate the output voltage $v_{out}(y)$. Two analog-to-digital converters (ADC) are utilized to sample the outputs of the two stages and to compare them with the corresponding references. The load information, which can be obtained through inductor current measurement, estimation as discussed in Z. Lukic, Z. Zhao, S. M. Ahsanuzzaman, and A. Prodic, "Self-tuning digital current estimator for low-power switching converters," in *IEEE Applied Power Electronics Conference* (APEC-2008), pp. 529-534, March 2008), or directly from the load, sets the reference for the bus voltage based on the load requirement. The reference for the bus voltage is selected such that optimum efficiency is achieved for the given operating condition. For achieving a high power factor, the flyback converter is operated at the boundary conduction mode (BCM). The BCM operation minimizes current stress and results in a relatively low electromagnetic interference.

As shown in FIG. 3, waveforms 16 resulting from an embodiment of the present invention may include, the current waveforms on the primary side ($i_{primary}$), secondary side ($i_{secondary}$) and the input current ($i_{in}$). As explained in the following subsection, $ADC_1$ is utilized in controlling both voltages of the capacitive divider (i.e. the bus voltage), $v_{bus}(t)$ and the voltage across $C_{top}$ capacitor, $v_{top}(t)$. The fast transient control block utilizes charge stored at $C_{top}$ by momentarily turning on $SW_6$ during transients, to improve the inductor current slew rate in the second stage.

Simultaneous Control of Both Divider Tap Voltages

To explain simulations regulation of both tap voltages of the capacitive divider, as an example, the flyback converter, such as of the embodiment of the present invention shown in FIG. 1, may be used. Similar principles can be applied for other converters, including other embodiments of the present invention, with indirect energy transfer, such as boost and buck-boost based topologies.

To provide voltages for both taps of the capacitive divider, a flyback transformer with two secondary windings could be used. However such a solution suffers from a cross-regulation problem that affects output voltage regulation and might require a custom flyback transformer design. To eliminate these problems and simplify system implementation, a method for providing two independent voltages is incorporated in the present invention. In the system and apparatus of embodiments of the present invention, both divider taps are controlled from the same secondary winding of the flyback converter.

Figure 4:
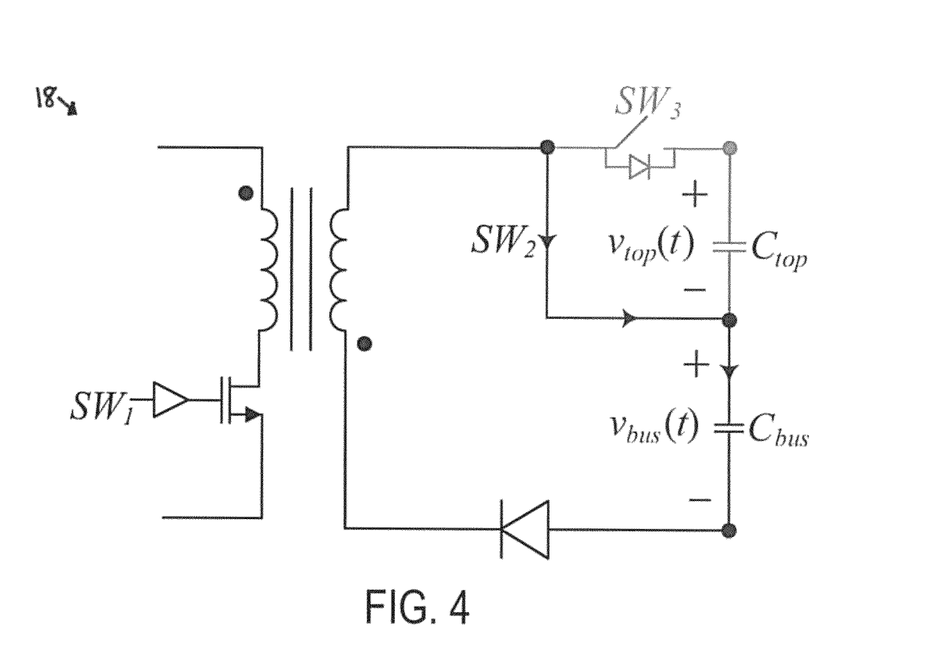
FIG. 4 illustrates a circuit diagram showing charging of a bus capacitor in accordance with an embodiment of the present invention.

In an embodiment of the present invention charging of a bus capacitor occur in a manner as is shown in the bus capacitor circuit diagram 18 of FIG. 4. In such an embodiment of the present invention when $SW_2$ is on, the secondary winding current charges the bottom capacitor. During this time the body diode of $SW_3$ is reversed biased. In this case $ADC_1$ samples the voltage stored at the bus capacitor, i.e. $v_{bus}(t)$.

Figure 5:
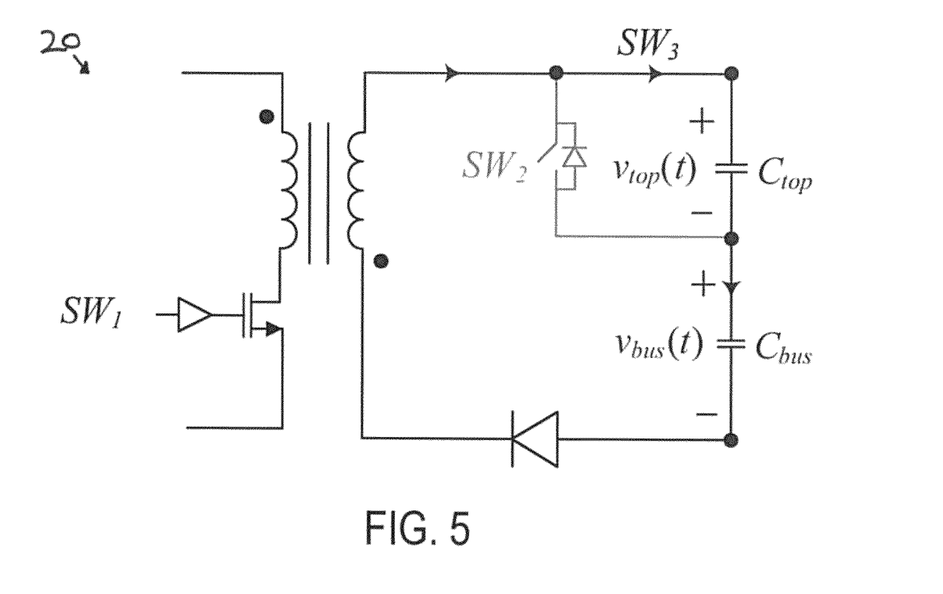
FIG. 5 illustrates a circuit diagram showing the charging of a top capacitor in accordance with an embodiment of the present invention.

Another aspect of the present invention is shown in the top capacitor circuit diagram 20 showing the charging of a top capacitor in accordance with an embodiment of the present invention of FIG. 5. As is shown in FIG. 5, by turning on $SW_3$ the series connection of both capacitors is charged. In this case the $ADC_1$ samples the sum of voltages stored across both capacitors. Since, as is described in the previous section, the top capacitor is such smaller than the bottom one, the voltages across them are not changed equally. The voltage of the smaller (i.e. top) capacitor is primarily affected, practically allowing the two voltages to be controlled independently.

Figure 6:
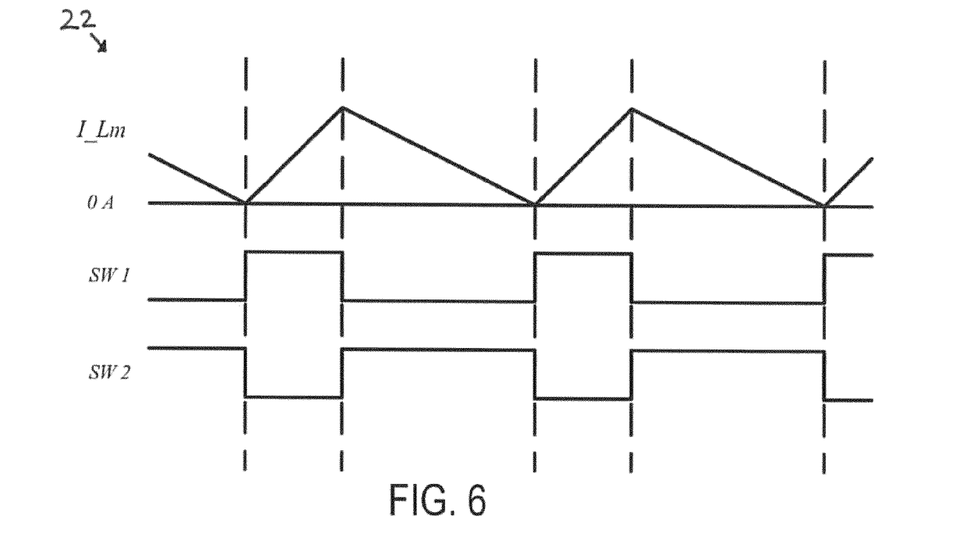
FIG. 6 illustrates a timing diagram bus capacitor charging relating to an embodiment of the present invention.
Figure 7:
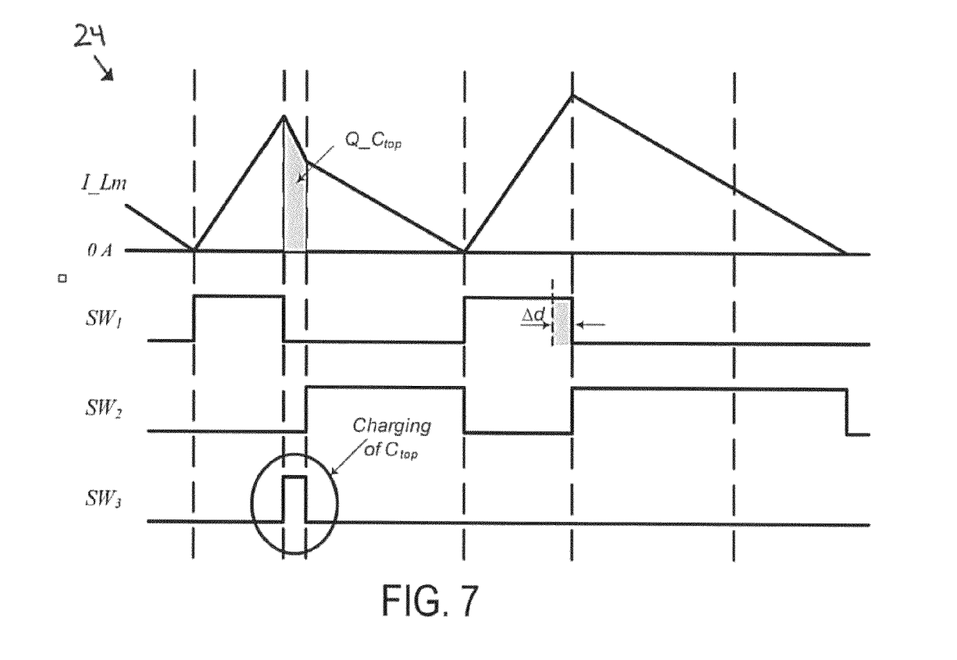
FIG. 7 illustrates a timing diagram of top capacitor charging relating to an embodiment of the present invention.

This is performed over a portion of one switching period, as shown in timing diagrams of FIGS. 6 and 7. Specifically, FIG. 6 shows a bus capacitor timing diagram 22, which shows bus capacitor charging of an embodiment of the present invention. While FIG. 7 shows a top capacitor timing diagram 24, which shows top capacitor charging of an embodiment of the present invention.

As discussed herein, and as will be recognized by a skilled reader, similar types of controls can be implemented with other indirect energy transfer topologies, where during one portion of time energy previously stored in an inductor would be passed to the bottom capacitor only and during the other portion through the serial connection of the two capacitors.

As an additional illustration of the principle, FIG. 6 shows the conventional operation of the flyback (i.e. boundary conduction mode) without charging of the top capacitor, where the total inductor current is used to supply the bottom capacitor.

Furthermore, FIG. 7 shows the switching cycle with a portion of the secondary conduction period is used to charge up $C_{top}$. This is shown as charge $Q\_C_{top}$ when $SW_3$ is on. Since a portion of the charge is given to $C_{top}$, the controller increases the on-time in the following cycle, for $SW_1$ (Δd in FIG. 7), to maintain steady bus voltage.

Increased Conduction Loss and Light Load Efficiency Improvement

Compared to a conventional flyback design known in the prior art, the first stage converter of the system and apparatus of an embodiment of the present invention has an extra switch ($SW_2$) in the conduction path. However since the switch is now rated for half the voltage, the increase in the conduction loss in minimized. This is due to the fact that the channel length—hence the on resistance—of semiconductor devices is proportional to the component rating. Similarly, addition of $SW_5$ will now require blocking in both directions for $SW_4$. As a result, $SW_4$ needs to be replaced by two switches in series with half the voltage rating, as is shown in FIG. 1. The size of the $SW_3$ and $SW_6$ is significantly smaller compared to other switches, as the rms current through them is much smaller. Furthermore, during light load operation, to improve the efficiency of the converter, only $SW_3$ and $SW_6$ can be used to regulate the output voltage.

EXPERIMENTAL RESULTS

To verify the operation of the present invention system, such as that shown in FIG. 1, a embodiment of the present invention having a universal input, two-stage 30 W ac-dc converter with power factor correction and programmable bus and output voltages was utilized in a series of tests. In this embodiment of the present invention, the witching frequency of the first stage varies between 50 kHz to 200 kHz, depending on the operating condition, and the second stage operates with 500 kHz fixed switching frequency.

Figure 8:
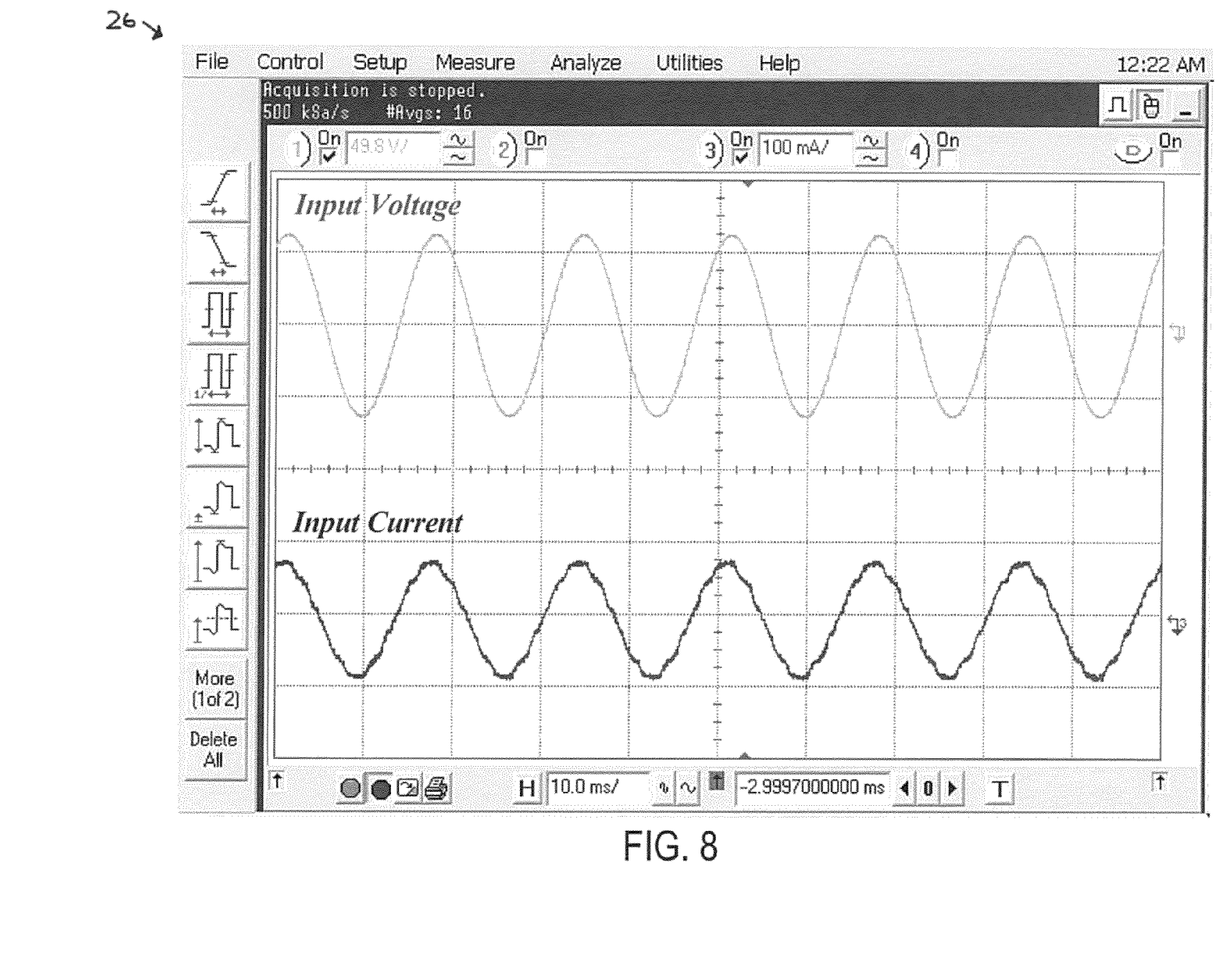
FIG. 8 illustrates a screen display of an input voltage and current waveform in accordance with an embodiment of the present invention, in which Ch1 is an input voltage (50V/div), and Ch2 is an input current (100 mA/div).
Figure 9:
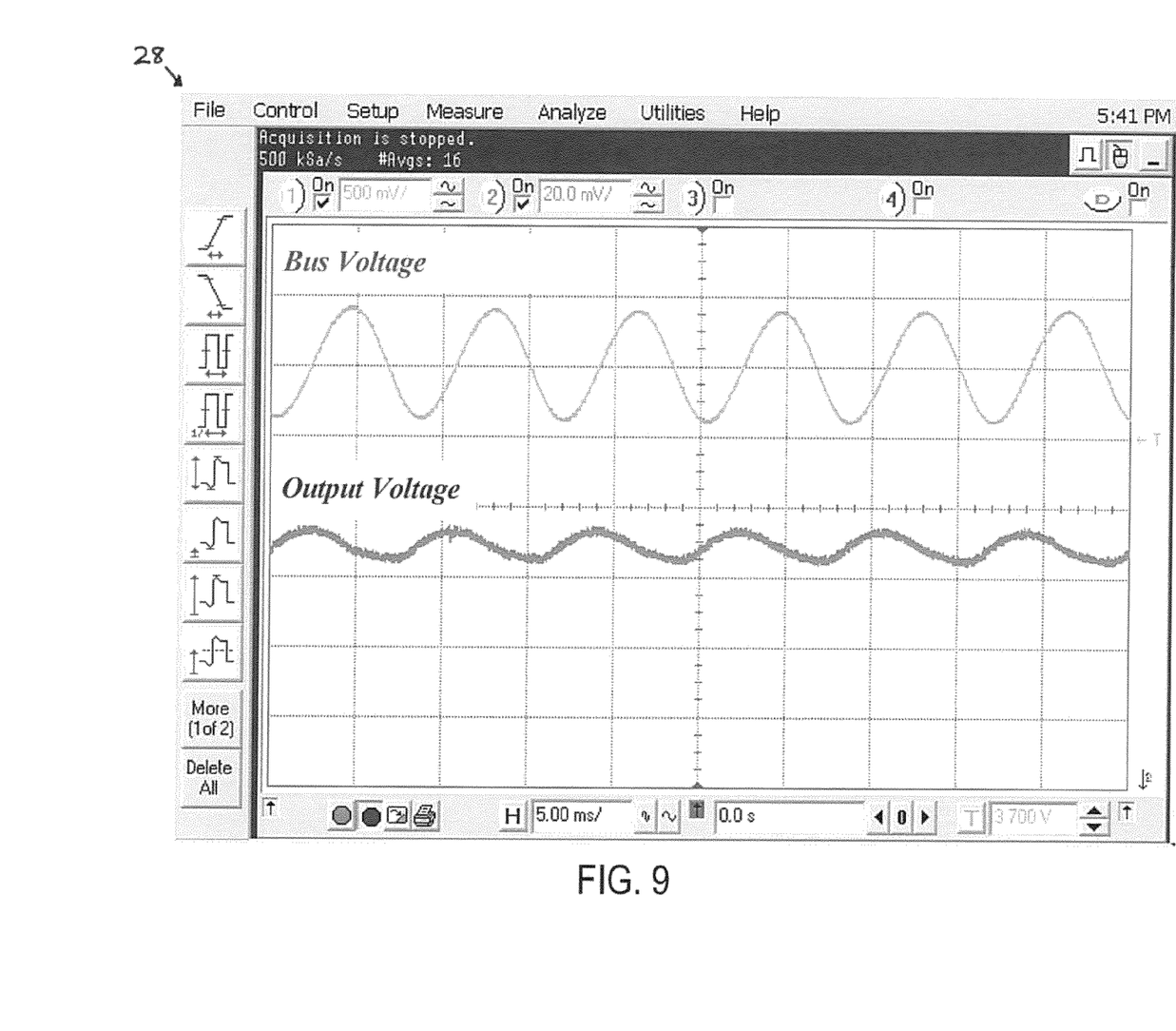
FIG. 9 illustrates a screen display of a regulation of bus voltage and output voltage in accordance with an embodiment of the present invention, in which Ch1 is a bus voltage (500 mV/div), and Ch2 is an output voltage (20 mV/div).

As shown, results of the tests include the review of a display of waveform results 26 that incorporate an input voltage and current waveform of the embodiment of the present invention, in which Ch1 is an input voltage (50V/div), and Ch2 is an input current (100 mA/div), as shown in FIG. 8. The results of the tests further include the review of a display of regulation results 28 that incorporate the regulation of bus voltage and output voltage in accordance with an embodiment of the present invention, in which Ch1 is a bus voltage (500 mV/div), and Ch2 is an output voltage (20 mV/div), as shown in FIG. 9. The results of such tests, as shown in FIGS. 8 and 9, verify proper steady-state operation of the system performing power factor correction. The power factor of the input current waveform, as shown in FIG. 8, is approximately 0.98 and stays in an approximate 0.95 to 0.99 range over all operating conditions.

Regulation of the bus voltage and the output voltage regulations is further shown in FIG. 9. The results shown in FIG. 9 show that even if a 600 μF capacitor is used in an embodiment of the present invention, which is at least 50% smaller than that of state of the art constant voltage single phase solutions, the output voltage is well-regulated in the present invention. As discussed herein, this is achieved by allowing bus voltage to contain a relatively high ripple of $1.5V_{p\text{-}p}$ at twice the line frequency. However the output voltage of the converter shows tight regulation with 20 mV ripple at 2V output voltage across a 220 μF output capacitor.

Figure 10:
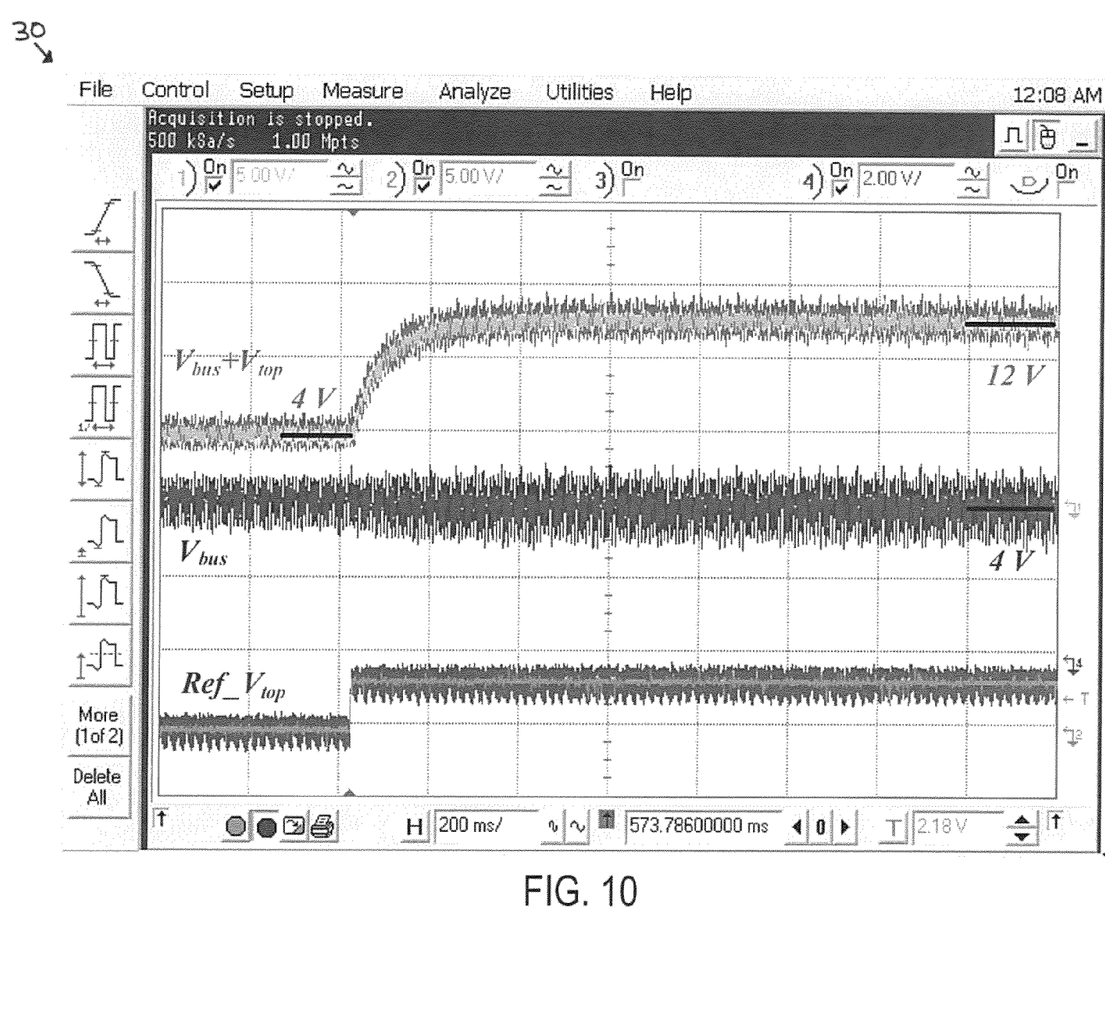
FIG. 10 illustrates a screen display of charging of a top capacitor in accordance with an embodiment of the present invention, in which Ch1 is a bus top cap voltage (5V/div), Ch2 is a bus voltage (2V/div), and Ch3 is a change reference for the top capacitor.

Test results further include the review of a display of charging results 30 that incorporate the charging of a top capacitor in accordance with an embodiment of the present invention, in which Ch1 is a bus+top cap voltage (5V/div), Ch2 is a bus voltage (2V/div), and Ch3 is a change reference for the top capacitor, as shown in FIG. 10. Independent charging is demonstrated through a step voltage change of the top capacitor. The charging results show that once the reference for the top capacitor is updated, the capacitor is charged to 8V (i.e. the output voltage is increased to 12 V) in 150 ms without affecting constant 4V across the bus voltage (i.e. the voltage of the bottom capacitor).

Figure 11:
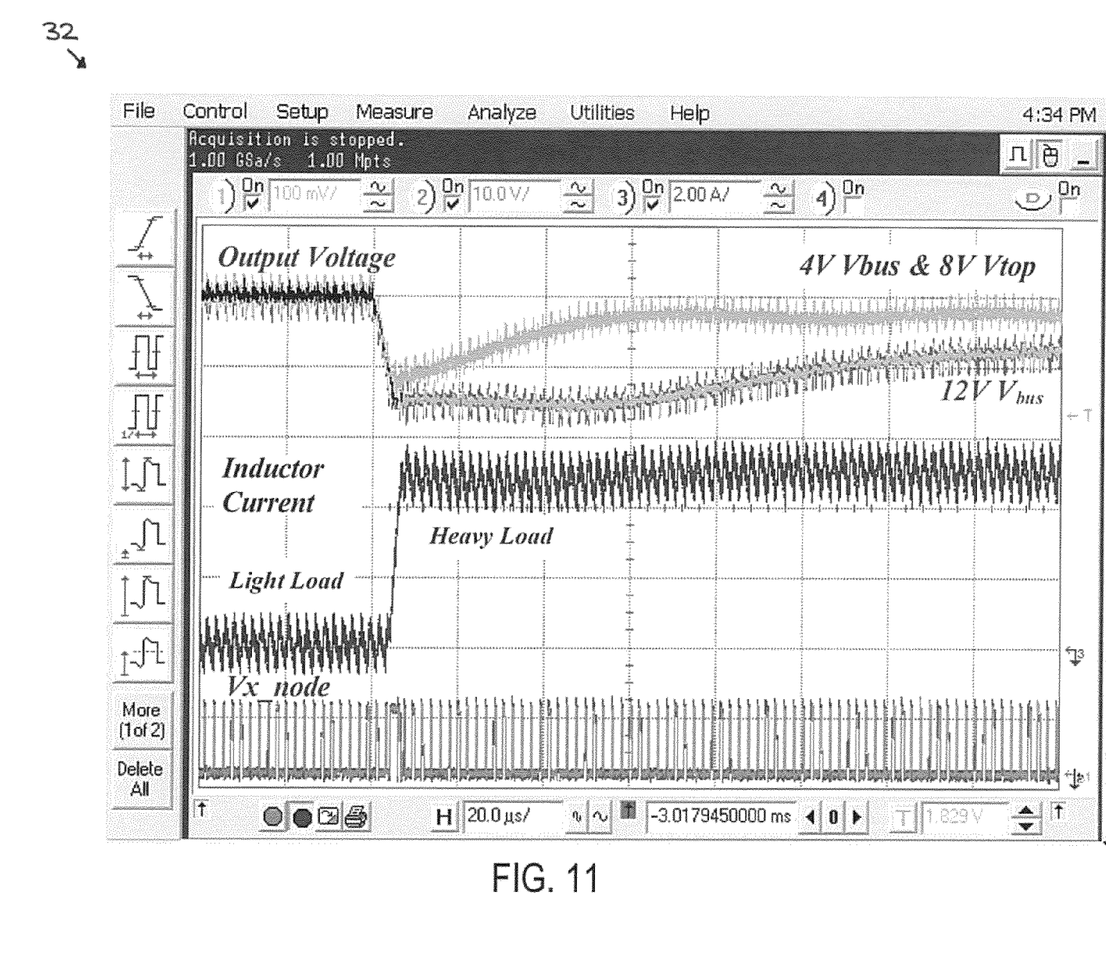
FIG. 11 illustrates a screen display of a transient response comparison in accordance with an embodiment of the present invention, in which Ch1 shows a programmable $v_{bus}$ and $v_{top}$ (100 mV/div); Ch2 shows a Buck with 12V $V_{in}$ (100 mV/div); Ch3 shows Inductor current (2 A/div); and Ch4 shows $V_x$ node voltage (10V/div).

Test results further include the review of a display of transient response results 32 that incorporate a transient response comparison in accordance with an embodiment of the present invention, in which Ch1 shows a programmable and $v_{bus}$ and $v_{top}$ (100 mV/div); Ch2 shows a Buck with 12V $V_{in}$ (100 mV/div); Ch3 shows Inductor current (2 A/div); and Ch4 shows $V_x$ node voltage (10V/div), as shown in FIG. 11. This shows a transient response comparison between the introduced converter architecture and a conventional downstream buck stage. For the architecture case of the tested embodiment of the present invention, the bus voltage was regulated at 4V to minimize switching losses of the downstream converter, and the top capacitor was charged to 8V. In another embodiment of the present invention utilized in the testing, the conventional buck was operating with a fixed 12V input voltage. As the waveform shows, both result in similar voltage deviations during the transients.

In other words, significantly, the architecture of the system, apparatus and method of the embodiment of the present invention allows efficiency optimization without sacrificing the transient response. For 2V output and 4V bus voltage the efficiency of the second stage is measured to be 87% for 4 A output current, compared to 81% efficiency for 12V fixed bus voltage. In case of lighter loads applied in other embodiments of the present invention this improvement may be even larger, due to reduction of more dominant switching losses.

While various embodiments have been described by way of illustration, it will be appreciated that various changes and modifications may be, made without departing from the scope of the present invention.

We claim:
1. A PFC rectifier with a programmable output voltage operable to reduce the size or volume of a converter in a downstream stage of the PFC rectifier, comprising:
   a) a front converter incorporated in a front stage, and said front converter incorporating a non symmetric capacitive divider incorporating a top capacitor and a bottom capacitor, wherein:

i) the top capacitor is operable to store energy at a sufficiently high voltage to provide hold up time and increase a current slew rate during transients to provide a fast dynamic transient response; and ii) the bottom capacitor is operable to dynamically adjust on-line power processing and regulate the efficiency of a downstream stage of the PFC rectifier; and b) a buck converter incorporated in the downstream stage.

2. The PFC rectifier of claim 1, wherein the non symmetric capacitive divider incorporates independently controllable tap voltages, such that the voltages are dynamically controllable.

3. The PFC rectifier of claim 1, wherein the PFC rectifier incorporates a two-stage system having an on-line efficiency optimization and being operable to dynamically adjust downstream stage supply voltage.

4. The PFC rectifier of claim 1, wherein the PFC rectifier incorporates a modified flyback design having a single secondary winding, and is operable to perform virtually independent regulation of diver voltages by way of charging one of the following: the bottom capacitor, or the top capacitor and the bottom capacitor.

5. The PFC rectifier of claim 1, wherein the bottom capacitor is larger than the top capacitor and the top capacitor has a higher voltage.

6. The PFC rectifier of claim 1, wherein voltage of the bottom capacitor is a centre tap voltage that is adaptively changed to perform on-line power processing efficiency optimization in accordance with conditions in a circuit of the PFC rectifier.

7. The PFC rectifier of claim 1, wherein the front converter is a flyback converter operable in discontinuous conduction mode.

8. A method for controlling a programmable output voltage in a PFC rectifier that incorporates a converter in a downstream stage having a reduced size and volume, comprising the steps of:

a) providing a non symmetric capacitive divider in a front stage of the PFC rectifier, the divider having a top capacitor and a bottom capacitor;

b) operating the top capacitor to store energy at a sufficiently high voltage to provide hold up time and increase a current slew rate during transients to provide a fast dynamic transient response;

c) operating the bottom capacitor to dynamically adjust on-line power processing and regulate the efficiency of a downstream stage of the PFC rectifier;

d) operating the converter in the downstream stage; and e) operating a controller to control the front stage and the downstream stage.

9. The method of claim 8, incorporating the step of performing virtually independent regulation of divider voltages by: charging the bottom capacitor; or charging the top capacitor and the bottom capacitor.

10. The method of claim 8, incorporating the step of improving transient response of the downstream stage by increasing a voltage applied at the input of the downstream stage to reduce an output capacitor value.

11. The method of claim 8, incorporating the step of minimizing inductance of the downstream stage by regulating an input voltage introduced to the downstream stage, whereby a centre tap voltage is in the vicinity of an output voltage.

12. The method of claim 8, incorporating the step of reducing switching losses of the converter by reducing switch voltage of the downstream converter.

13. The method of claim 8, incorporating the step of the PFC rectifier providing a fast transient response while operating at or virtually at an optimized efficiency point.

14. A PFC rectifier system with a programmable output voltage operable to reduce the size or volume of a converter in the downstream stage of the PFC rectifier, comprising:

a) a flyback-buck two stage converter operable to achieve a combination of a front stage and a downstream stage;

b) an integrated controller operable to regulate the operation of the front stage and the downstream stage;

c) a non symmetric capacitive divider in the front stage, the divider having a top capacitor and a bottom capacitor, wherein:

i) the top capacitor is operable to store energy at a sufficiently high voltage to provide hold up time and increase a current slew rate during transients to provide a fast dynamic transient response; and ii) the bottom capacitor is operable to dynamically adjust on-line power processing and regulate the efficiency of a downstream stage of the PFC rectifier.

15. The PFC rectifier system of claim 14, wherein the front stage incorporates a modified flyback converter.

16. The PFC rectifier system of claim 14, wherein the downstream stage incorporates a conventional buck converter with an extra switch.

17. The PFC rectifier system of claim 14, wherein voltages of the bottom capacitor and top capacitor are independently regulated.

18. The PFC rectifier system of claim 14, wherein the controller incorporates two interactive control loops, including:

a) a front-end regulation of the flyback converter operable to achieve virtually a unity factor and to regulate the average values of divider tap voltages based on information provided by an efficiency optimization block; and b) a downstream regulation of the buck converter operable to achieve tight output voltage regulation and fast dynamic response.

19. The PFC rectifier system of coir 18, wherein the buck controller applies a minimum deviation control process during transients to recover current in a single on-off switching cycle with minimum output voltage deviation.

* * * * *